US012567597B2

(12) United States Patent
Nguyen et al.

(10) Patent No.: US 12,567,597 B2
(45) Date of Patent: Mar. 3, 2026

(54) FLOW BATTERY SYSTEMS AND METHODS OF USING THE SAME

(71) Applicant: University of Kansas, Lawrence, KS (US)

(72) Inventors: Trung Van Nguyen, Lawrence, KS (US); Yuanchao Li, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 868 days.

(21) Appl. No.: 17/777,512

(22) PCT Filed: Nov. 20, 2020

(86) PCT No.: PCT/US2020/061455

§ 371 (c)(1),
(2) Date: May 17, 2022

(87) PCT Pub. No.: WO2021/108244

PCT Pub. Date: Jun. 3, 2021

(65) Prior Publication Data

US 2023/0361328 A1 Nov. 9, 2023

Related U.S. Application Data

(60) Provisional application No. 62/941,064, filed on Nov. 27, 2019.

(51) Int. Cl.
*H01M 8/06* (2016.01)
*H01M 8/04029* (2016.01)
(Continued)

(52) U.S. Cl.
CPC ..... *H01M 8/0693* (2013.01); *H01M 8/04029* (2013.01); *H01M 8/04201* (2013.01); *H01M 8/188* (2013.01); *H01M 2300/0011* (2013.01)

(58) Field of Classification Search
CPC ........ H01M 8/18; H01M 8/182; H01M 8/184; H01M 8/188; H01M 8/0656;
(Continued)

(56) References Cited

U.S. PATENT DOCUMENTS

| 9,350,039 | B2 | 5/2016 | Perry |
| 10,333,164 | B2 | 6/2019 | Sullivan |

(Continued)

FOREIGN PATENT DOCUMENTS

| KR | 101551929 B1 | 9/2015 |

OTHER PUBLICATIONS

Trung Nguyen and Robert F. Savinell 2010 *Electrochem. Soc. Interface* 19 54.

(Continued)

*Primary Examiner* — Matthew W Van Oudenaren
(74) *Attorney, Agent, or Firm* — Bell & Manning, LLC

(57) ABSTRACT

Flow battery systems are provided, including flowing a liquid electrolyte from a storage tank of a flow battery system to an electrode chamber of the flow battery system, the liquid electrolyte comprising a solvent and a first active ion dissolved in the solvent, wherein the storage tank comprises the liquid electrolyte and a first solid composed of the active ion and an ion of the solvent; inducing an electrochemical reaction in the electrode chamber to convert the first active ion dissolved in the solvent to a second active ion dissolved in the solvent, wherein the first solid dissolves to provide more of the first active ion dissolved in the solvent; flowing the liquid electrolyte comprising the solvent and the second active ion dissolved in the solvent from the electrode chamber back to the storage tank; and precipitating a second solid composed of the second active ion and the ion of the solvent in the storage tank.

28 Claims, 2 Drawing Sheets

(51) Int. Cl.
   *H01M 8/04082*        (2016.01)
   *H01M 8/18*        (2006.01)

(58) Field of Classification Search
   CPC ........... H01M 8/0693; H01M 8/04201; H01M
                           8/04029; H01M 2300/0085
   See application file for complete search history.

(56)                References Cited

U.S. PATENT DOCUMENTS

| 2010/0047671 | A1 | 2/2010 | Chiang et al. | |
| 2013/0011702 | A1* | 1/2013 | Horne ..................... | B60L 53/52 |
| | | | | 429/105 |
| 2013/0196206 | A1 | 8/2013 | Park et al. | |
| 2014/0227620 | A1* | 8/2014 | Perry ................ | H01M 8/04067 |
| | | | | 429/416 |
| 2018/0191008 | A1 | 7/2018 | Hammad et al. | |
| 2018/0219240 | A1 | 8/2018 | Gyenge | |
| 2018/0316033 | A1* | 11/2018 | Evans ............... | H01M 8/04186 |
| 2019/0348700 | A1* | 11/2019 | Zhou ..................... | H01M 8/188 |
| 2024/0194918 | A1 | 6/2024 | Van Nguyen et al. | |

OTHER PUBLICATIONS

Blanc, Christian, and Alfred Rufer. "Understanding the vanadium redox flow batteries." *Paths to Sustainable Energy* 18.2 (2010): 334-336.
Jia, Chuankun, et al. "High-energy density nonaqueous all redox flow lithium battery enabled with a polymeric membrane." *Science advances* 1.10 (2015): e1500886.
Li, Xianfeng. "Redox Targeting Improves Flow Batteries." *Joule* 3.9 (2019): 2066-2067.
International Search Report and Written Opinion for PCT/US2020/061455 mailed Feb. 21, 2021; pp. 1-10.

* cited by examiner

FLOW BATTERY SYSTEMS AND METHODS OF USING THE SAME

CROSS-REFERENCE TO RELATED APPLICATIONS

The present application is a National Stage of International Application No. PCT/US20/61455, filed Nov. 20, 2020, which claims priority to U.S. provisional patent application No. 62/941,064 that was filed Nov. 27, 2019, the entire contents of both of which are incorporated herein by reference.

BACKGROUND

Most redox flow battery (RFB) systems used for electrical energy storage are based on some aqueous or non-aqueous soluble ions or compounds in the electrolyte solution. Because of the low solubility of most ions and compounds in aqueous and non-aqueous solvents (as compared to solid reactants like lithium or zinc in lithium and zinc batteries), these redox flow battery systems have low energy density. For example, the commercialized all vanadium redox flow battery system has an average energy density of 20 Wh/kg while that of the lithium ion battery system is 100-265 Wh/kg. To store a lot of energy in the form of these chemicals requires a very large volume of solution in a very large tank, making these systems expensive.

SUMMARY

Methods of operating flow battery systems are provided. In an embodiment, such a method comprises: flowing a liquid electrolyte from a storage tank of a flow battery system to an electrode chamber of the flow battery system, the liquid electrolyte comprising a solvent and a first active ion dissolved in the solvent, wherein the storage tank comprises the liquid electrolyte and a first solid composed of the active ion and an ion of the solvent; inducing an electrochemical reaction in the electrode chamber to convert the first active ion dissolved in the solvent to a second active ion dissolved in the solvent, wherein the first solid dissolves to provide more of the first active ion dissolved in the solvent; flowing the liquid electrolyte comprising the solvent and the second active ion dissolved in the solvent from the electrode chamber back to the storage tank; and precipitating a second solid composed of the second active ion and the ion of the solvent in the storage tank.

Flow battery systems are also provided. In an embodiment, such a flow battery system comprises a storage tank comprising a liquid electrolyte comprising a solvent and a first active ion dissolved in the solvent, the storage tank further comprising a first solid composed of the first active ion and an ion of the solvent; an electrode chamber in fluid communication with the storage tank; a second electrode chamber in fluid and electrical communication with the electrode chamber; and optionally, a membrane between the electrode chambers.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
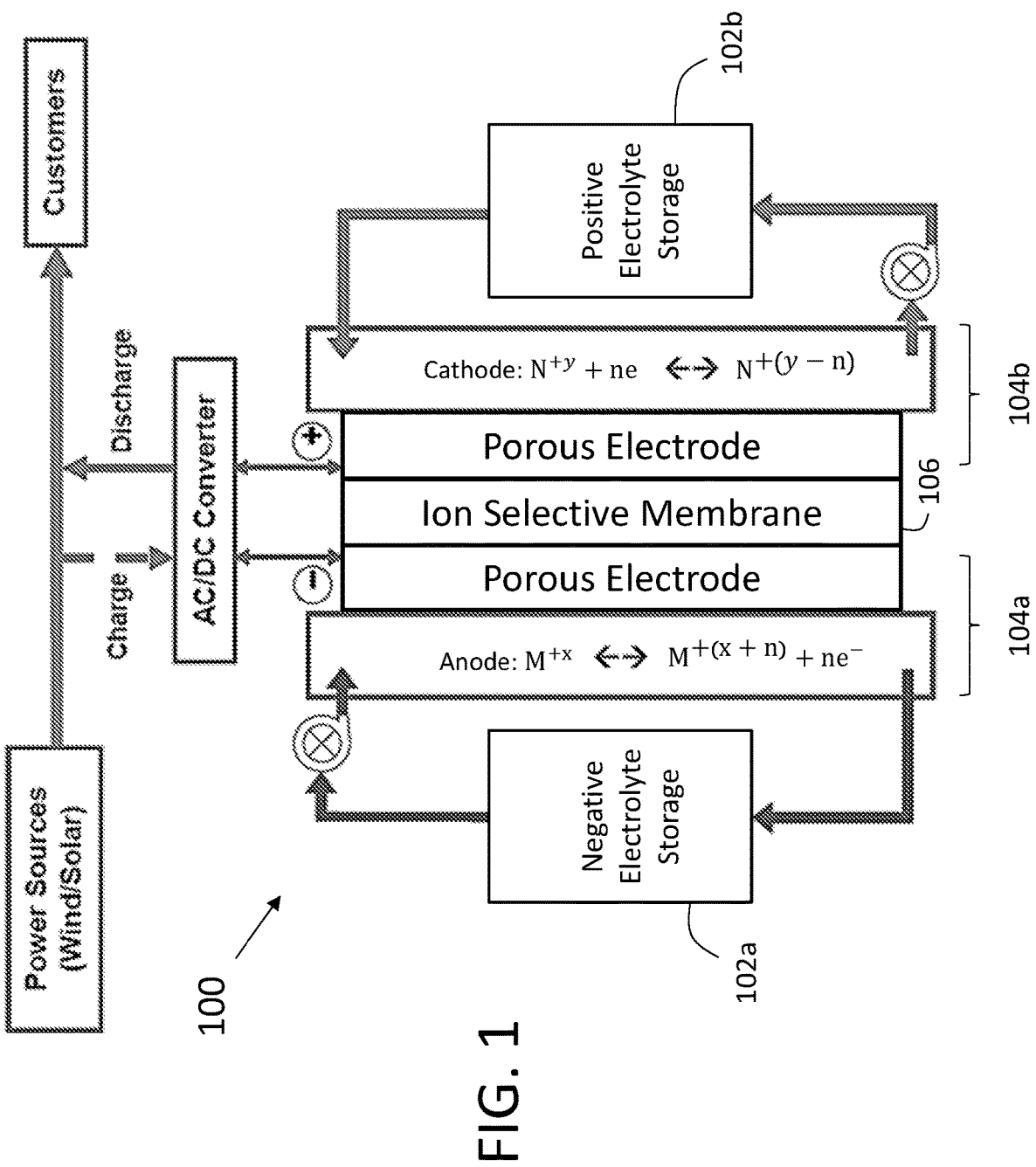
FIG. 1 is a schematic of an illustrative redox flow battery system according to the present disclosure. The electrode chambers are shown in a discharge mode.

A flow battery system is an electrochemical device that converts the chemical energy in electroactive materials directly to electrical energy. Electroactive materials in a flow battery system are stored externally in an electrolyte and are introduced into the device only during operation. Systems in which all the electroactive materials are dissolved within a liquid electrolyte are called redox (for reduction/oxidation) flow battery systems (RFBs). A schematic of a redox flow battery system 100 is shown in FIG. 1. Systems in which one or more electroactive components are stored internally are called hybrid flow batteries. Examples include the zinc-bromine and zinc-cerium flow battery systems. Table 1, below, lists some of the chemistries on which redox and hybrid flow battery systems are based.

TABLE 1

Characteristics of some flow battery systems.

| System | Reactions | $E_{cell}^{o}$ | Electrolyte Negative/Positive |
|---|---|---|---|
| Redox | | | |
| All Vanadium | Negative: $V^{2+} \underset{\text{charge}}{\overset{\text{discharge}}{\rightleftarrows}} V^{3+} + e\text{-}$ | 1.4 V | $H_2SO_4/H_2SO_4$ |
| | Positive: $VO_2^+ + 2H^+ + e\text{-} \underset{\text{charge}}{\overset{\text{discharge}}{\rightleftarrows}} VO^{2+} + H_2O$ | | |
| Vanadium-Polyhalide | Negative: $V^{2+} \underset{\text{charge}}{\overset{\text{discharge}}{\rightleftarrows}} V^{3+} + e\text{-}$ | 1.3 V | $VCl_3\text{-HCl}/$ $NaBr\text{—HCl}$ |
| | Positive: $\frac{1}{2} Br_2 + e\text{-} \underset{\text{charge}}{\overset{\text{discharge}}{\rightleftarrows}} Br^-$ | | |

TABLE 1-continued

Characteristics of some flow battery systems.

| System | Reactions | $E_{cell}^{o}$ | Electrolyte Negative/Positive |
|---|---|---|---|
| Bromine-Polysulfide | Negative: $2\,S_2^{2-} \underset{\text{charge}}{\overset{\text{discharge}}{\rightleftarrows}} S_4^{2-} + 2e^-$ <br> Positive: $Br_2 + 2e^- \underset{\text{charge}}{\overset{\text{discharge}}{\rightleftarrows}} 2\,Br^-$ | 1.5 V | $Na_2S_2/NaBr$ |
| Iron-Chromium | Negative: $Cr^{2+} \underset{\text{charge}}{\overset{\text{discharge}}{\rightleftarrows}} Cr^{3+} + e^-$ <br> Positive: $Fe^{3+} + e^- \underset{\text{charge}}{\overset{\text{discharge}}{\rightleftarrows}} Fe^{2+}$ | 1.2 V | $HCl\text{—}FeCl_2\text{—}CrCl_3$ (both sides) |
| $H_2\text{—}Br_2$ | Negative: $H_2 \underset{\text{charge}}{\overset{\text{discharge}}{\rightleftarrows}} 2H^+ + 2e^-$ <br> Positive: $Br_2 + 2e^- \underset{\text{charge}}{\overset{\text{discharge}}{\rightleftarrows}} 2Br^-$ | 1.1 V | HBr-PEM* |
| Hybrid | | | |
| Zinc-Bromine | Negative: $Zn \underset{\text{charge}}{\overset{\text{discharge}}{\rightleftarrows}} Zn^{2+} + 2e^-$ <br> Positive: $Br_2 + 2e^- \underset{\text{charge}}{\overset{\text{discharge}}{\rightleftarrows}} 2\,Br^-$ | 1.8 V | $ZnBr_2/ZnBr_2$ |
| Zinc-Cerium | Negative: $Zn \underset{\text{charge}}{\overset{\text{discharge}}{\rightleftarrows}} Zn^{2+} + 2e^-$ <br> Positive: $Ce^{4+} + 2e^- \underset{\text{charge}}{\overset{\text{discharge}}{\rightleftarrows}} Ce^{3+}$ | 2.4 V | $CH_3SO_3H$ (both sides) |

*Proton exchange membrane

As shown in FIG. 1, the redox flow battery system 100 comprises two separate liquid electrolytes, each contained in respective storage tanks 102*a*, 102*b*. The liquid electrolytes comprise a solvent and dissolved active ions. Storage tank 102*a* stores the liquid electrolyte for electrochemical reactions which take place in a negative electrode chamber 104*a* and storage tank 102*b* stores the liquid electrolyte for electrochemical reactions which take place in a positive electrode chamber 104*b*. These electrochemical reactions may be induced by connecting the system 100 to a circuit comprising an electrical load and supplying a current to the circuit (discharging mode) or by connecting the system 100 to a power source and supplying a current to the system 100 (charging mode).

As used herein, "negative electrode" refers to the anode and "positive electrode" refers to the cathode during discharge. It is understood that these terms are reversed during charge.

As used herein, "active ion" may be used in reference to each of $M^{+x}$, $M^{+(x+n)}$, $N^{+y}$, $N^{+(y-n)}$ shown in FIG. 1. Which of these particular ions is being referenced depends upon whether the system 100 is being operated in discharge or charge mode and whether the anode 104*a* or cathode 104*b* is being referenced. For example, with reference to the anode 104*a* being operated in discharge mode, $M^{+x}$ may be considered to be an active ion being converted to $M^{+(x+n)}$. $M^{+x}$ may also be referred to as a "reactant" ion and $M^{+(x+n)}$ as a "product" ion. In charge mode, $M^{+(x+n)}$ may be considered to be an active ion (or a reactant) being converted to $M^{+x}$ (a product). For this reason, "active ion" encompasses each of $M^{+x}$, $M^{+(x+n)}$, $N^{+y}$, $N^{+(y-n)}$.

As shown in FIG. 1, fresh liquid electrolyte (being delivered to a respective electrode chamber 104*a*, *b*) and spent liquid electrolyte (returning from a respective electrode chamber 104*a*, *b*) may be stored in respective single storage tanks 102*a*, *b* or separate storage tanks (not shown). An ion selective membrane 106 may be included to prevent mixing or cross-over of active ions which may result in a chemical short-circuit. Only the common counter ion carrier is allowed to cross the membrane 106. For example, in the bromine-polysulfide system, as $Na_2S_2$ is converted to $Na_2S_4$ at the anode 204*a* and $Br_2$ is converted to $2Br^-$ at the cathode 104*b*, the excess $Na^+$ ions at the anode 104*a* are allowed to cross to the cathode 104*b* to maintain electroneutrality condition. Similarly, in the all vanadium system, as $V^{2+}$ is oxidized to $V^{3+}$ at the anode 104*a* and $V^{5+}$ (in the form of $VO_2^+$) is reduced to $V^{4+}$ (in the form of $VO^{2+}$) at the cathode 104b, hydronium ions are transported across a proton conducting membrane from the anode 104a to the cathode 104b. In such a case, a microporous non-selective membrane separator may be used since most of the current is carried by high mobility protons in the acidic liquid electrolyte and since the crossover of the common vanadium cation lowers efficiency but does not cause a permanent loss of capacity.

The present disclosure is directed at increasing the storage energy density in flow battery systems, including redox flow battery systems such as system 200. The approach involves increasing the amount of active ions that can be stored in a given volume of liquid electrolyte. The idea is to store these active ions in a solution that is saturated with dissolved active ions and contains an amount of the active ions in their respective undissolved solid forms. This "undissolved solid form" refers to a chemical compound of the active ion and an ion of the solvent. The term "precipitate" and the like may be used interchangeably with the phrase "undissolved solid form." This undissolved solid form/precipitate may contain a variable number of bonded solvent molecules, e.g., $H_2O$. Using the cathode of the all vanadium system as an example, the solvent comprises $H_2SO_4$ and $H_2O$, the undissolved solid form/precipitate of the $VO_2^+$ active ions is $(VO_2)_2SO_4$, and the undissolved solid form/precipitate of the $VO^{2+}$ active ions is $VOSO_4$. Each of these chemical compounds may be hydrated, e.g., $VOSO_4 \cdot 4H_2O$. This description makes clear that "undissolved solid form" and "precipitate" are terms distinguished from a solid material comprising active ions adsorbed/absorbed thereon or intercalated therein. Solids are contained within storage tank(s) of the system 100 (i.e., one or both of 102a, b), rather than the electrode chambers 104a, b. That is, only liquid electrolyte comprising the solvent and dissolved active ions circulates to respective electrode chambers 104a, b, while respective solids are restricted to storage tank(s).

As noted above, the present flow battery systems comprise an undissolved solid form of active ions in one or more storage tanks of the systems. The energy densities of the active ions are much higher when the active ions are in their undissolved solid form rather than dissolved in solution. For example, the concentration of vanadyl sulfate ($VOSO_4$) is kept at about 1.5 M in existing all vanadium systems, which is about 42% less than its saturation concentration at the operating temperature of 45° C. At 1.5 M, there are 1.5 moles of vanadium ($4^+$) ions per liter of $H_2SO_4$ (a component of the solvent of the liquid electrolyte). However, the undissolved solid form ($VOSO_4$) of these ions has a density of 2250 g/liter. A liter of the solid contains 2250 g or 13.8 moles of vanadium ($4^+$) ions. This is about 9.2 times that of the dissolved ions, representing a tremendous increase in density, comparable to the energy storage density of solid systems like lithium ion batteries.

However, use of the undissolved solid form of active ions presents significant challenges. Specifically, operating a flow battery system with active ions at or near their saturation concentrations may lead to solid precipitation in the electrode chambers, resulting in system failure. It is for this reason that existing flow battery systems are operated without undissolved solid and the dissolved active ions are kept significantly lower than their saturation concentrations.

To address these challenges, the inventors have developed two approaches. One approach, which may be referred to as a "temperature swing" approach, involves storage of a saturated solution of dissolved active ions along with an amount of the active ions in their undissolved solid form at a temperature (a storage temperature) at which the solubility of the active ions is low and operating the respective electrode chamber at a temperature (operating temperature) at which the solubility of the active ions is higher. At the storage temperature, a greater amount of the total amount of the active ions may be stored in their higher energy density undissolved solid form. At the operating temperature, the increase in solubility avoids the problem of solid precipitation in the respective electrode chamber and allows for a greater amount of product/reactant to be generated in the electrode chamber during discharge/charge.

In the temperature swing approach and for active ions exhibiting positive temperature dependent solubility, the storage temperature is less than the operating temperature. In such cases, during operation, the low temperature, low solubility saturated solution in the storage tank is heated to the higher, operating temperature of the respective electrode chamber. At the higher operating temperature, the previously saturated solution becomes undersaturated and can accept additional active ions, allowing additional product/reactant to be generated in the electrode chamber during discharge/charge. A higher operating temperature also increases the reaction and diffusion rates, leading to higher power output. When this solution is returned to the cooler storage tank, the solubility of the active ions decreases, inducing precipitation of the active ions into their undissolved solid form. The term "precipitation" refers to the formation of an insoluble compound of the active ion and an ion of the solvent to generate the undissolved solid form of the active ion. Thus, this process is distinguished from active ion adsorption/absorption on, or intercalation in, a solid material. Moreover, use of the undissolved solid forms of the active ions as described herein provides substantially higher energy densities than is possible by adsorption/absorption/intercalation.

In the temperature swing approach, to minimize the amount energy needed to heat and cool the solution as it is pumped between the respective electrode chamber and storage tank, a two-way heat exchanger may be used. The heat needed to heat the solution is obtained from the energy extracted upon return of the hotter solution. An additional benefit from the present systems and methods is that by using saturated solutions of active ions, the feed concentration of the ions to the battery will remain constant allowing the battery to operate with constant voltage and current or power output.

Another approach, which may be referred to as an "oversaturation" approach, takes advantage of the supersaturation nature of certain compounds, compounds that can be supersaturated for a period of time without precipitating during that time unless nucleation sites are available. As with the temperature swing approach, the oversaturation approach involves storage of a saturated solution of dissolved active ions along with an amount of the active ions in their undissolved solid form. However, unlike the temperature swing approach, in the oversaturation approach, the storage temperature and the operating temperature may be the same temperature. In the respective electrode chamber, electrochemical reactions are induced to convert reactant active ions to product active ions (in discharge mode and vice versa in charge mode) until the product active ions reach a concentration greater than their saturation concentration. That is, the liquid electrolyte in the electrode chamber is allowed to become a supersaturated solution, resulting in additional product/reactant being generated in the electrode chamber during discharge/charge. When this solution is returned to the respective storage tank comprising nucleation sites, product/reactant active ions precipitate into their undissolved solid form. The oversaturation approach is useful for active ions that do not exhibit positive temperature dependent solubility.

The two approaches may be used independently or may be combined. In a combined approach, both a temperature swing is used (i.e., different storage and operating temperatures) and liquid electrolyte is allowed to become a supersaturated solution in its respective electrode chamber. A combined approach is useful for active ions that exhibit positive temperature dependent solubility since the magnitude of the temperature swing can be reduced.

The temperature swing approach is further described as follows. For convenience, this embodiment is described with reference to storage tank 102a and its respective electrode chamber 104a being initially operated in a discharge mode in which a reactant active ion (R) being flowed from the storage tank 102a is electrochemically converted to a product active ion (P) in the electrode chamber 104a. Initially, the storage tank 102a contains an amount of undissolved solid R and liquid electrolyte comprising solvent and dissolved R, i.e., the liquid electrolyte is a saturated solution of R. Additionally, the storage tank 102a (and the liquid electrolyte therein) is at a storage temperature $T_1$ while the electrode chamber 104a (and the liquid electrolyte therein) is at an operating temperature $T_2$. As noted above, the storage temperature $T_1$ is a temperature at which the solubility of R in the liquid electrolyte is low and the operating temperature $T_2$ is a temperature at which the solubility of R in the liquid electrolyte is higher.

During the first discharge mode, only liquid electrolyte comprising the dissolved R (not the undissolved solid R) is flowed to the electrode chamber 104a. The temperature of the liquid electrolyte is changed from $T_1$ to $T_2$, allowing the liquid electrolyte in the electrode chamber 104a to accept additional dissolved R to generate additional dissolved P. As dissolved R is converted to dissolved P, undissolved solid R in the storage tank 102a dissolves to keep dissolved R at its saturated concentration. This continues until undissolved solid R is consumed, after which the concentration of dissolved R decreases as it is converted to dissolved P.

Upon return to the storage tank 102a from the electrode chamber 104a, the temperature of the liquid electrolyte is changed from $T_2$ back to $T_1$. The liquid electrolyte being flowed back to the storage tank 102a now comprises dissolved P. In the storage tank 102a, the dissolved P precipitates into its undissolved solid form once the concentration of dissolved P reaches its saturation concentration at $T_1$. Thus, precipitation may be induced by the temperature swing (i.e., $T_2$ to $T_1$). Precipitation may be further induced by including nucleation sites in the storage tank 102a, i.e., surfaces on which undissolved solid P forms. These nucleation sites may be an amount of undissolved solid R, an amount of undissolved solid P, an inert solid such as a carbon material (e.g., activated carbon, graphite foil), a zeolite, etc., or combinations thereof.

During a charging mode, the reverse process occurs. Briefly, liquid electrolyte comprising solvent and dissolved P is flowed to the electrode chamber 104a to generate dissolved R. As dissolved P is consumed, undissolved solid P dissolves to generate more dissolved P, leading to more dissolved R. Dissolved R in the liquid electrolyte is flowed back to the storage tank 102a where it precipitates into undissolved solid R once its concentration reaches its saturation concentration at $T_1$.

To further illustrate the temperature swing approach during the charge mode in which R is being generated, the solubility of R is arbitrarily assumed to be 1 M at $T_1$ (storage temperature) and 1.3 M at $T_2$ (operating temperature). When the temperature of the liquid electrolyte comprising dissolved R at its saturation concentration is at $T_2$, the liquid electrolyte can accept an additional 0.3 mole per liter of dissolved R. In other words, for every liter per minute of liquid electrolyte being flowed to the electrode chamber 104a at $T_2$, an additional 0.3 mole/min of dissolved R can be created by electrochemical conversion. If the liquid electrolyte comprising 1.3 M dissolved R is flowed back to the storage tank 102a at $T_1$, 0.3 M of dissolved R precipitates out as undissolved solid R. A similar description applies during the discharge mode except that P is being generated and P replaces R in the description above.

The oversaturation approach is further described as follows. For convenience, this embodiment is also described with reference to storage tank 102a and its respective electrode chamber 104a being initially operated in a discharge mode in which R being flowed from the storage tank 102a is electrochemically converted to P in the electrode chamber 104a. Initially, the storage tank 102a contains an amount of undissolved solid R and liquid electrolyte comprising solvent and dissolved R, i.e., the liquid electrolyte is a saturated solution of R. As noted above, the storage tank 102a (and the liquid electrolyte therein) and the electrode chamber 104a (and the liquid electrolyte therein) may be at the same temperature.

During the first discharge mode, only liquid electrolyte comprising the dissolved R (not the undissolved solid R) is flowed to the electrode chamber 104a. Dissolved R is converted to dissolved P in the electrode chamber 104a. Conversion is allowed to continue until dissolved P reaches a concentration greater than its saturation concentration at the operating temperature without precipitating, i.e., until the liquid electrolyte in the electrode chamber 104a is a supersaturated solution of P. The additional amount of dissolved P generated depends upon the amount of oversaturation (i.e., difference between its saturation concentration and supersaturation concentration). At the same time, undissolved solid R in the storage tank 102a dissolves until undissolved solid R is consumed during conversion, after which the concentration of dissolved R decreases.

Upon return to the storage tank 102a from the electrode chamber 104a, the liquid electrolyte now comprises dissolved P, eventually at a concentration greater than its saturation concentration. By including nucleation sites in the storage tank 102a, the dissolved P in the supersaturated solution precipitates into its undissolved solid form. These nucleation sites may be an amount of undissolved solid R, an amount of undissolved solid P, an inert solid such as activated carbon, zeolite, etc., or combinations thereof.

During a charge mode, the reverse process occurs. Briefly, liquid electrolyte comprising solvent and dissolved P is flowed to the electrode chamber 104a to generate dissolved R, continuing until dissolved R reaches a concentration greater than its saturation concentration at the operating temperature. At the same time, as dissolved P is consumed, undissolved solid P dissolves to generate more dissolved P, leading to more dissolved R. The liquid electrolyte, now a supersaturated solution of R, is flowed back to the storage tank 102a where dissolved R precipitates into undissolved solid R in the presence of nucleation sites.

To further illustrate the oversaturation approach during the discharge mode, the saturation concentration of P is arbitrarily assumed to be 1 M at the operating temperature and its supersaturation concentration is 1.5 M at this temperature. This means that for every liter per minute of liquid electrolyte being flowed to the electrode chamber 104a, an additional 0.5 mole/min of dissolved P is generated. When the supersaturated solution of P is flowed back to the storage tank 102a comprising nucleation sites, the 0.5 M of dissolved P will precipitate out as undissolved solid P. A similar description applies during the charge mode except that R is being generated and P replaces R in the description above.

The present methods and flow cell battery systems may be based on a variety of chemistries, including those shown in Table 1, above. Others are shown in Table 2, below.

The present flow cell battery system may be a hybrid flow cell battery system in which only one electrode chamber is in fluid communication with a storage tank comprising solid active ions and liquid electrolyte comprising solvent and dissolved active ions. This includes the hybrid flow cell battery systems of Table 1. However, other embodiments may be used in which the other electrode chamber of the hybrid flow cell battery system is, e.g., an oxygen electrode chamber or a hydrogen electrode chamber (see Example 5).

TABLE 2

Additional flow battery systems.

| System Redox | Reactions | $E_{cell}^{o}$ | Electrolyte Negative/Positive |
|---|---|---|---|
| Iron-Vanadium | Negative: $V^{2+}$ $\underset{\text{charge}}{\overset{\text{discharge}}{\rightleftharpoons}}$ $V^{3+}$ + e- <br><br> Positive: $Fe^{3+}$ + e- $\underset{\text{charge}}{\overset{\text{discharge}}{\rightleftharpoons}}$ $Fe^{2+}$ | 1.0 V | HCl or $H_2SO_4$ (both sides) |
| Iron-Chromium | Negative: $Cr^{2+}$ $\underset{\text{charge}}{\overset{\text{discharge}}{\rightleftharpoons}}$ $Cr^{3+}$ + e- <br><br> Positive: $Fe^{3+}$ + e- $\underset{\text{charge}}{\overset{\text{discharge}}{\rightleftharpoons}}$ $Fe^{2+}$ | 1.2 V | [HCl or $H_2SO_4$] (both sides) |
| Iron-Titanium | Negative: $Ti^{3+}$ + $H_2O$ $\underset{\text{charge}}{\overset{\text{discharge}}{\rightleftharpoons}}$ $TiO^{2+}$ + $2H^+$ + e- <br><br> Positive: $Fe^{3+}$ + e- $\underset{\text{charge}}{\overset{\text{discharge}}{\rightleftharpoons}}$ $Fe^{2+}$ | 0.7 V | [HCl or $H_2SO_4$] (both sides) |
| Cerium-Titanium | Negative: $Ti^{3+}$ + $H_2O$ $\underset{\text{charge}}{\overset{\text{discharge}}{\rightleftharpoons}}$ $TiO^{2+}$ + $2H^+$ + e- <br><br> Positive: $Ce^{4+}$ + e- $\underset{\text{charge}}{\overset{\text{discharge}}{\rightleftharpoons}}$ $Ce^{3+}$ | 1.6 V | [$CH_3SO_3H$] (both sides) |

The desired chemistry determines the composition of the solvent and the undissolved solid form of the active ion. The desired chemistry also influences which approach is used. As noted above, the temperature swing approach is particularly useful for materials exhibiting positive temperature dependent solubility. For example, each of the vanadium active ions derived from a corresponding sulfate in the all vanadium sulfate system ($V^{+2}$, $V^{+3}$, $VO^{+2}$, $VO_2^+$ sulfate salts) have a positive temperature dependent solubility. The oversaturation approach involves the use of materials which are capable of existing in a supersaturated state for a period of time. Taking the all vanadium sulfate system as another example, $VO^{+2}$ in $H_2SO_4$ is such a material. This is further demonstrated in the Examples, below.

The present flow cell battery system may be a redox flow cell battery system similar to that shown in FIG. 1 in which each electrode chamber is in fluid communication with a respective storage tank comprising liquid electrolyte. In such embodiments, each respective storage tank may comprise solid active ions (i.e., the undissolved solid form of the active ion) and liquid electrolyte comprising solvent and dissolved active ions. Alternatively, only one storage tank may comprise solid active ions and liquid electrolyte comprising solvent and dissolved active ions.

Operation of the present flow cell battery systems has been generally described above. For the temperature swing approach (or combination approach), parameters relevant to operation include the values of the storage and operating temperatures. As noted above, the storage temperature is selected such that the active ion's solubility is low and the operating temperature is selected such that the active ion's solubility is higher. Thus, the specific values depend upon the desired chemistry and the desired difference in solubilities (related to the desired additional energy density to be stored/generated). Known techniques may be used to determine solubilities of the active ions in the solvent as a function of temperature in order to select appropriate specific values. However, in embodiments, the storage and operating temperatures may be in a range of from −20° C. to 50° C., including from −10° C. to 40° C. and from 0° C. to 30° C. The difference between the storage and operating temperatures may be at least 5° C., at least 10° C., at least 15° C., at least 20° C., or in a range of from 5° C. to 30° C.

Another parameter relevant to operation of the present flow battery systems, particularly for the oversaturation approach (or combination approach), is the oversaturation threshold of the active ions in the solvent at the desired operating temperature. The oversaturation threshold refers to the concentration at which the dissolved active ions precipitate spontaneously (without the presence of nucleation sites) over the desired timescale versus in the presence of nucleation sites. The oversaturation threshold sets the upper concentration to avoid precipitation in the electrode chamber. The specific value of the oversaturation threshold depends upon the desired chemistry and known techniques may be used for its determination.

Another parameter relevant to all approaches is the precipitation/dissolution rate of the solids (i.e., undissolved solid forms of active ions) in the solvent at the storage temperatures. Again, these rates depend upon the desired chemistry, the use and type of nucleation sites available for precipitation, and known techniques may be used to determine the rates. However, for measurement of precipitation rates in the absence of nucleation sites, it is important that there be no such nucleation sites available. If nucleation sites are to be used, the type as well as the size and density of the sites are important. For measurement of dissolution rates, the rate depends upon the size, surface property, and surface area per unit volume or mass of the solid being dissolved. Finally, for both of these measurements, they will depend upon the presence, or absence, of mixing.

Another parameter relevant to all approaches is the relative amount of liquid electrolyte and solid (i.e., undissolved solid form of active ions) being used. The weight ratio of undissolved solid to liquid electrolyte determines the effective energy storage density. The weight ratio to be used depends upon the minimum volume of the working liquid, the pumping rate, and the dissolution/precipitation rates. If the dissolution/precipitation rates are very fast, then a lower volume of working liquid is suitable. By "working liquid," it is meant the total amount of liquid in the flow battery system.

Figure 2:
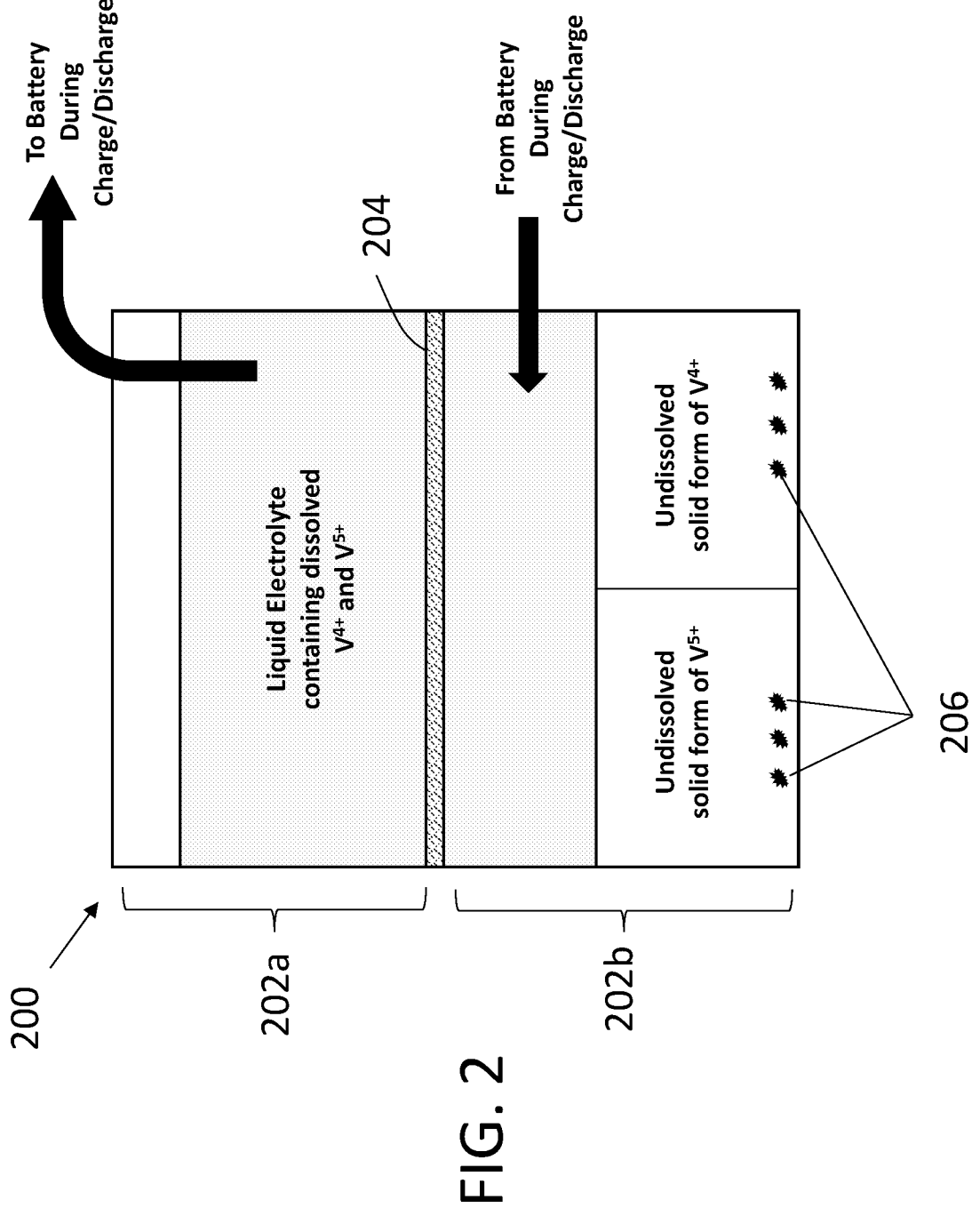
FIG. 2 shows an illustrative storage tank that may be used with any of the present methods and flow battery systems.

FIG. 2 shows an illustrative storage tank 200 that may be used with any of the present methods and flow battery systems. The storage tank 200 is illustrated with reference to the cathode electrode chamber of the all vanadium system, i.e., the active ions being referenced include $V^{5+}$ (undissolved solid form is $(VO_2)_2SO_4$) and $V^{4+}$ (undissolved solid form is $VOSO_4$). The storage tank 200 comprises two compartments 202a, b separated by a porous separating layer 204. The porous separating layer 204 is configured to allow the passage of the liquid electrolyte comprising dissolved $V^{5+}$ and $V^{4+}$ while preventing the passage of the undissolved solid forms of these active ions which are restricted to the compartment 202b. In the compartment 202b, the undissolved solid forms of the active ions may exist separately (as shown in FIG. 2) or together. As shown in FIG. 2, the compartment 202b may further comprise a material 206 comprising nucleation sites, but this is not necessary.

The following examples are provided to further demonstrate the present methods and flow battery systems described above.

EXAMPLES

Example 1

26.1164 grams of $VOSO_4.xH_2O$ was dissolved into 25 mL deionized water at 40° C. The saturation concentration was measured as 4.28 M at 40° C. 10 mL of the saturated solution was poured into a new vial and cooled to room temperature. Precipitated solid was found at the bottom of the vial after three days at room temperature. The solid was able to be re-dissolved after reheating to 40° C.

Example 2

After the 10 mL sample of the saturated solution from Example 1 was cooled to room temperature, extra as-is commercial $VOSO_4$ solid was added. No precipitation was observed within one day. This shows that this aspect can be used to delay or prevent solid precipitation.

Example 3

A 1 M $V^{5+}$ ($VO_2^+$)/0.4 M $V^{4+}$ ($VO^{2+}$) solution in 3M $H_2SO_4$ was vaporized at 40° C. until there precipitated solid formed. Then the precipitated solid was re-dissolved in deionized water and ultraviolet-visible spectroscopy showed that the precipitated solid is $(VO_2)_2SO_4$.

Example 4

A supersaturated solution of 4 M $VOSO_4$ in 3M $H_2SO_4$ at 50° C. was prepared. The solution was then cooled to 0° C. Precipitation occurred after 30 mins. Tiny ice crystals formed at 0° C. may have served as nucleation sites to accelerate precipitation. Another supersaturated solution of 4 M $VOSO_4$ in 3M $H_2SO_4$ solution was prepared at 50° C. with additional $VOSO_4$ solid to serve as nucleation sites. The solution was then cooled to room temperature. Precipitation occurred after 1.5 h. Note: The saturated concentrations of $VOSO_4$ in deionized water and 3M $H_2SO_4$ are different.

Example 5

Additional experiments were conducted to further demonstrate the feasibility of the solid/liquid storage concept and the temperature swing approach using $VOSO_4$, a reactive material in the all vanadium flow battery system. At 50° C., the solution can be stored over 4 M of $VOSO_4$ in 3M $H_2SO_4$ as dissolved ions. Because of its lower solubility at 10° C., at this temperature, some of the dissolved ions precipitate as the $VOSO_4$ solid. This process is reversible. When the solution with solid at 10° C. is heated to 50° C., the solid re-dissolves into the solution.

Tables 3 and 4, below, demonstrate the feasibility of the oversaturation approach. Table 3 shows that without any nucleation sites, the precipitation rate is quite slow taking days to completely precipitate all the solid, specifically 10 days when the oversaturation level is 0.6 M and 4 days when it is 1 M. Table 4 shows that by providing nucleation sites from either the solid form of the active ions or a type of zeolite, the precipitation rate can be reduced to minutes. It is noted that the commercially available solid form of the active ions is not necessarily a desirable nucleation material. Instead, a precipitate formed from an oversaturated solution of the active ions is a significantly better nucleation material, as shown by the results of in Table 4.

TABLE 3

| Natural precipitation rate (no nucleation sites). | | | | | |
|---|---|---|---|---|---|
| $[VO^{+2}]$ (M) | $[H_2SO_4]$ (M) | Temperature (° C.) | $VO^{+2}$ Solubility (M) | Oversaturation Level (M) | Stable Time (days) |
| 2.4 | 3 | 20 | 1.8 | 0.6 | 10 |
| 2.8 | 3 | 20 | 1.8 | 1 | 4 |

TABLE 4

| Precipitation rate in the presence of nucleation sites. | | | |
|---|---|---|---|
| Solution concentration (M)*1 | Temperature (° C.) | Nucleation Centers | Precipitation Time |
| 3.2 | 20 | N/A*2 | 12-24 h |
| 2.8 | 20 | N/A | 4 d |
| 2.4 | 20 | N/A | 10 d |
| 3.2 | 40 | N/A | 48 h |
| 2.8 | 40 | N/A | >7 d |
| 3.2 | 40 | Activated carbon felt*3 | 4 h |
| 3.2 | 40 | 4.21 mg/cm² Zeolite-Y780-coated PTFE | 2.5 h |
| 3.0 | 40 | Activated carbon felt | 17 h |
| 2.8 | 40 | Activated carbon felt | 52 h |
| 2.6 | 40 | Activated carbon felt | 60 h |
| 3.2 | 20 | Activated carbon felt | 90 min |
| 3.2 | 20 | Activated carbon felt w/ nitrogen functionalization*4 | 90 min |
| 3.2 | 20 | Pure graphite foil | 60 min |
| 3.2 | 20 | HNO₃-treated XC72R (carbon powder) | 45 min |
| 2.8 | 20 | 10% Zeolite Y 2802*5 | 75 min |
| 2.8 | 20 | 10% Zeolite Y 780 | 150 min |
| 3.2 | 20 | Dissociated VOSO₄ salt*6 | 5 min |
| 2.8 | 20 | Dissociated VOSO₄ salt | 15 min |
| 2.6 | 20 | Dissociated VOSO₄ salt | 25 min |

*1Concentration of vanadium sulfate dissolved in 3M H₂SO₄ solution.
*2N/A means no additional nucleation sites. The solution was poured into a new and clean glass vial.
*3Model number: Zoltek Tm Rx35 activated woven carbon material PW03
*4Nitrogen functionalization is accomplished by purging NH₃ gas through the activated carbon felt at 600° C.
*510% is the weight ratio of zeolite to VOSO₄ mass.
*6Dissociated VOSO₄ salt is the precipitated VOSO₄ solid from the supersaturated solution.

Example 6

A $H_2$—V (hydrogen-vanadium) hybrid flow battery system was used to demonstrate the temperature-swing approach. The electrochemical reactions on the positive/negative electrode are shown below:

Positive electrode:

$$VO^{2+} + H_2O \underset{discharge}{\overset{charge}{\rightleftharpoons}} VO_2^+ + 2H^+ + e^-$$

Negative electrode:

$$2H^+ + 2e^- \underset{discharge}{\overset{charge}{\rightleftharpoons}} H_2$$

Full reaction:

$$2VO^{2+} + 2H_2O \underset{discharge}{\overset{charge}{\rightleftharpoons}} 2VO_2^+ + 2H^+ + 2se^-$$

A liquid electrolyte (positive electrolyte) was prepared for delivery to the positive electrode. The initial positive electrolyte was composed of 1.95 M $VOSO_4$ in water (the saturation concentration in water at room temperature) and an additional amount of 1 M solid $VOSO_4 \cdot 4H_2O$ was added. The negative electrode was fed with humidified $H_2$. The storage vial containing the liquid electrolyte was placed into a container filled with flowing house water, having a temperature of 19.5-20° C. (storage temperature). An inlet tube to the flow cell and the flow field of the flow cell were heated and maintained at 45° C. (operating temperature). An outlet tube from the flow cell was merged into the cooling water to cool the liquid electrolyte as it was pumped back to the storage vial. Only the liquid electrolyte was pumped into the flow cell. Solid was left on the bottom of the storage vial and mixed slowly with a magnetic bar stirrer. The color of pure $VOSO_4$ is blue. The liquid electrolyte was charged to 80% state of charge (SOC) at 1.3 V, and the color became dark green. It is noted that SOC is a measure of how much of the active material or capacity is available in the system. At the beginning, the SOC is 0 because $VOSO_4$ is a product and not a reactant. When the system is charged to 80% SOC, it means 80% of $VO^{2+}$ has been converted to $VO_2^+$.) At the end of the charge operation, all the solid disappeared and no new solid formed in a short time. This implies that the product $VO_2^+$ ions were in the dissolved form and the liquid electrolyte was a supersaturated solution. (In a different, separate study, the $VO_2^+$ ions eventually precipitated out of the solution after a few hours.) The supersaturated charged liquid electrolyte was then pumped to the flow cell for the discharge operation. The discharge operation was operated at 0.7 V (for most of the time) until the final current decreased below 5 mA/cm² and 99% of charge capacity was recovered. At this point, the color of the solution changed back to light blue. Some precipitation started to show up on the bottom of the vial. After overnight storage, a large amount of precipitated $VOSO_4$ was observed.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of operating a flow battery system, the method comprising:
   (a) flowing a liquid electrolyte from a storage tank of a flow battery system to an electrode chamber of the flow battery system, the liquid electrolyte comprising a solvent and a first active ion dissolved in the solvent, wherein the storage tank comprises the liquid electrolyte and a first solid composed of the first active ion and an ion of the solvent, wherein the storage tank further comprises a material comprising nucleation sites on which the first solid and a second solid composed of a second active ion and the ion of the solvent form;
   (b) inducing an electrochemical reaction in the electrode chamber to convert the first active ion dissolved in the solvent to a second active ion dissolved in the solvent, wherein the first solid dissolves to provide more of the first active ion dissolved in the solvent;

(c) flowing the liquid electrolyte comprising the solvent and the second active ion dissolved in the solvent from the electrode chamber back to the storage tank; and (d) precipitating the second solid composed of the second active ion and the ion of the solvent in the storage tank, wherein the liquid electrolyte is passed to the electrode chamber without passing the first solid and the second solid to the electrode chamber, the storage tank further comprising a porous separating layer configured to divide the storage tank into compartments such that the liquid electrolyte is passed to the electrode chamber without passing the first solid and the second solid to the electrode chamber.

2. The method of claim 1, wherein the liquid electrolyte in the storage tank is at a storage temperature and the liquid electrolyte in the electrode chamber is at a different, operating temperature, wherein the first active ion's solubility in the liquid electrolyte and the second active ion's solubility in the liquid electrolyte are greater at the operating temperature than at the storage temperature.

3. The method of claim 2, wherein the operating temperature is higher than the storage temperature.

4. The method of claim 1, wherein the material is an undissolved form of the first active ion, an undissolved form of the second active ion, or combinations thereof.

5. The method of claim 1, wherein the liquid electrolyte in the electrode chamber is at an operating temperature and the second active ion dissolved in the solvent reaches a concentration greater than its saturation concentration at the operating temperature in the liquid electrolyte in the electrode chamber.

6. The method of claim 5, wherein the material is an undissolved form of the first active ion, an undissolved form of the second active ion, or combinations thereof.

7. The method of claim 5, wherein the liquid electrolyte in the storage tank is at a different, storage temperature, wherein the first active ion's solubility in the liquid electrolyte and the second active ion's solubility in the liquid electrolyte are greater at the operating temperature than at the storage temperature.

8. The method of claim 1, wherein the first active ion and the second active ion are each independently selected from a group consisting of $V^{+2}$, $V^{+3}$, $VO^{+2}$, and $VO_2^+$.

9. The method of claim 1, further comprising:

(e) flowing a second liquid electrolyte from a second storage tank of the flow battery system to a second electrode chamber of the flow battery system, the second liquid electrolyte comprising a second solvent and a third active ion dissolved in the second solvent, wherein the second storage tank comprises the second liquid electrolyte and a third solid composed of the third active ion and an ion of the second solvent;

(f) inducing an electrochemical reaction in the second electrode chamber to convert the third active ion dissolved in the second solvent to a fourth active ion dissolved in the second solvent, wherein the third solid dissolves to provide more of the third active ion dissolved in the second solvent;

(g) flowing the second liquid electrolyte comprising the second solvent and the third active ion dissolved in the second solvent from the second electrode chamber back to the second storage tank; and (h) precipitating a fourth solid composed of the fourth active ion and the ion of the second solvent in the second storage tank.

10. A flow battery system comprising:

a storage tank comprising a liquid electrolyte comprising a solvent and a first active ion dissolved in the solvent, the storage tank further comprising a first solid composed of the first active ion and an ion of the solvent, wherein the storage tank further comprises a material comprising nucleation sites on which the first solid and a second solid composed of a second active ion and the ion of the solvent forms;

an electrode chamber in fluid communication with the storage tank;

a second electrode chamber in fluid and electrical communication with the electrode chamber; and optionally, a membrane between the electrode chambers, wherein the storage tank is configured so that the liquid electrolyte is passed to the electrode chamber without passing the first solid and the second solid to the electrode chamber, the storage tank further comprising a porous separating layer configured to divide the storage tank into compartments such that the liquid electrolyte is passed to the electrode chamber without passing the first solid and the second solid to the electrode chamber.

11. The flow battery system of claim 10, further comprising a heat exchanger in fluid communication with the storage tank and the electrode chamber and configured to adjust the liquid electrolyte's temperature.

12. The flow battery system of claim 11, wherein the heat exchanger is configured to maintain the temperature of the liquid electrolyte at a storage temperature in the storage tank and at a different, operating temperature in the electrode chamber.

13. The flow battery system of claim 12, wherein the operating temperature is greater than the storage temperature.

14. The flow battery system of claim 10, wherein the second electrode chamber is a hydrogen electrode chamber or an oxygen electrode chamber.

15. The flow battery system of claim 10, wherein the active ion is selected from a group consisting of $V^{+2}$, $V^{+3}$, $VO^{+2}$, and $VO^{2+}$.

16. The flow battery system of claim 10, further comprising a second storage tank in fluid communication with the second electrode chamber, the second storage tank comprising a second liquid electrolyte comprising a second solvent and a third active ion dissolved in the second solvent, the second storage tank further comprising a third solid composed of the third active ion and an ion of the second solvent.

17. The method of claim 4, wherein the material is $VOSO_4$, $(VO_2)_2SO_4$, or combinations thereof.

18. The method of claim 17, wherein the $VOSO_4$ is hydrated and the $(VO_2)_2SO_4$ is hydrated.

19. The method of claim 4, wherein the undissolved form of the first active ion is a precipitate formed from an oversaturated solution of the first active ion and the undissolved form of the second active ion is a precipitate formed from an oversaturated solution of the second active ion.

20. The flow battery system of claim 10, wherein the material is an undissolved form of the first active ion, an undissolved form of the second active ion, or combinations thereof.

21. The flow battery system of claim 20, wherein the material is $VOSO_4$, $(VO_2)_2SO_4$, or combinations thereof.

22. The flow battery system of claim 21, wherein the $VOSO_4$ is hydrated and the $(VO_2)_2SO_4$ is hydrated.

23. The flow battery system of claim 20, wherein the undissolved form of the first active ion is a precipitate formed from an oversaturated solution of the first active ion and the undissolved form of the second active ion is a precipitate formed from an oversaturated solution of the second active ion.

24. A storage tank for a flow battery system, the storage tank comprising a first solid composed of a first active ion and an ion of a solvent, wherein the storage tank further comprises a material comprising nucleation sites on which the first solid forms, wherein the material is an undissolved form of the first active ion, and further wherein the storage tank is configured so that a liquid electrolyte is passed to an electrode chamber of the flow battery system without passing the first solid to the electrode chamber, the storage tank further comprising a porous separating layer configured to divide the storage tank into compartments such that the liquid electrolyte is passed to the electrode chamber without passing the first solid to the electrode chamber.

25. The storage tank of claim 24, wherein the material is $VOSO_4$, $(VO_2)_2SO_4$, or combinations thereof.

26. The storage tank of claim 25, wherein the $VOSO_4$ is hydrated and the $(VO_2)_2SO_4$ is hydrated.

27. The storage tank of claim 24, wherein the undissolved form of the first active ion is a precipitate formed from an oversaturated solution of the first active ion.

28. The storage tank of claim 24, wherein the storage tank is in fluid communication with the electrode chamber of the flow battery system.

\* \* \* \* \*